United States Patent
Miyajima

(10) Patent No.: US 11,156,536 B2
(45) Date of Patent: Oct. 26, 2021

(54) METHOD FOR EVALUATING SHOCK RESISTANCE OF RUBBER MEMBER

(71) Applicant: THE YOKOHAMA RUBBER CO., LTD., Tokyo (JP)

(72) Inventor: Atsushi Miyajima, Hiratsuka (JP)

(73) Assignee: The Yokohama Ruber Co., Ltd., Tokyo (JP)

(*) Notice: Subject to any disclaimer, the term of this patent is extended or adjusted under 35 U.S.C. 154(b) by 149 days.

(21) Appl. No.: 16/500,590

(22) PCT Filed: Dec. 14, 2017

(86) PCT No.: PCT/JP2017/044863
§ 371 (c)(1),
(2) Date: Oct. 3, 2019

(87) PCT Pub. No.: WO2018/185976
PCT Pub. Date: Oct. 11, 2018

(65) Prior Publication Data
US 2020/0200662 A1 Jun. 25, 2020

(30) Foreign Application Priority Data
Apr. 5, 2017 (JP) ............... JP2017-074957

(51) Int. Cl.
*G01N 3/32* (2006.01)
*G01N 11/16* (2006.01)
*G01N 3/60* (2006.01)

(52) U.S. Cl.
CPC ........... *G01N 3/32* (2013.01); *G01N 3/60* (2013.01); *G01N 11/16* (2013.01)

(58) Field of Classification Search
CPC .. G01N 3/02; G01N 3/32; G01N 3/34; G01N 3/60; G01N 2203/0017; G01N 2203/0094; G01N 2203/0212
See application file for complete search history.

(56) References Cited

FOREIGN PATENT DOCUMENTS

| | | | | |
|---|---|---|---|---|
| CN | 106471276 A | 3/2017 | | |
| JP | S63-1950 A | 1/1988 | | |
| JP | H11-223623 A | 8/1999 | | |
| JP | 2000-198517 A | 7/2000 | | |
| JP | 2000198517 A | * | 7/2000 | ............. B65G 15/32 |
| JP | 2003-139669 A | 5/2003 | | |
| JP | 2004018752 A | * | 1/2004 | ............. C08L 21/00 |

(Continued)

*Primary Examiner* — Benjamin R Schmitt
(74) *Attorney, Agent, or Firm* — Carrier Blackman & Associates, P.C.; Joseph P. Carrier; Anne G. Sabourin

(57) ABSTRACT

A loss tangent tan δ is the ratio between a storage modulus and a loss modulus calculated from a stress when vibrations of a predetermined frequency are applied to a rubber member. When evaluating a shock resistance performance of the rubber member using an elongation at break Eb, a tensile strength at break TSb, and a loss tangent tan δ of the rubber member, a speed of an impact applied under use conditions of the rubber member is matched with a maximum speed of vibrations. As a result, the shock resistance performance can be evaluated using a value of the loss tangent tan δ corresponding to an impact actually applied to the rubber member, and it is possible to improve the accuracy of the shock resistance performance evaluation.

4 Claims, 7 Drawing Sheets

(56) References Cited

FOREIGN PATENT DOCUMENTS

| | | |
|---|---|---|
| JP | 2008-224510 A | 9/2008 |
| JP | 2009-222656 A | 10/2009 |
| JP | 2011-257187 A | 12/2011 |
| WO | 2017/038185 A1 | 3/2017 |

* cited by examiner

|  | | UNIT | SAMPLE A | SAMPLE B | SAMPLE C | REMARKS |
|---|---|---|---|---|---|---|
| PERFORMANCE EVALUATION VALUE | TENSILE STRENGTH AT BREAK | MPa | 22.3 | 28.2 | 20.9 | TSb |
| | ELONGATION AT BREAK | % | 572 | 562 | 530 | Eb |
| | LOSS TANGENT | - | 100 | 73 | 87 | $\tan \delta$ (10 kHz) RELATIVE VALUE |
| | SHOCK RESISTANCE PERFORMANCE EVALUATION INDEX | - | 100 | 90 | 76 | Eb × TSb × $\tan \delta$ RELATIVE VALUE |
| | BREAK ENERGY INDEX | | 12761 | 15848 | 11077 | Eb × TSb |
| | Eb × TSb × $\tan \delta$ (10 khz) | | 6543 | 5901 | 4944 | |
| TEST RESULTS | DROP IMPACT TEST | mm | 17.2 | 19.9 | - | NEEDLE ENTER DEPTH |
| | DIN ABRASION | mm$^3$ | 122 | 117 | 167 | |
| | CUT DAMAGE | | VERY LOW | LOW | HIGH | |

FIG. 5

SAMPLE A
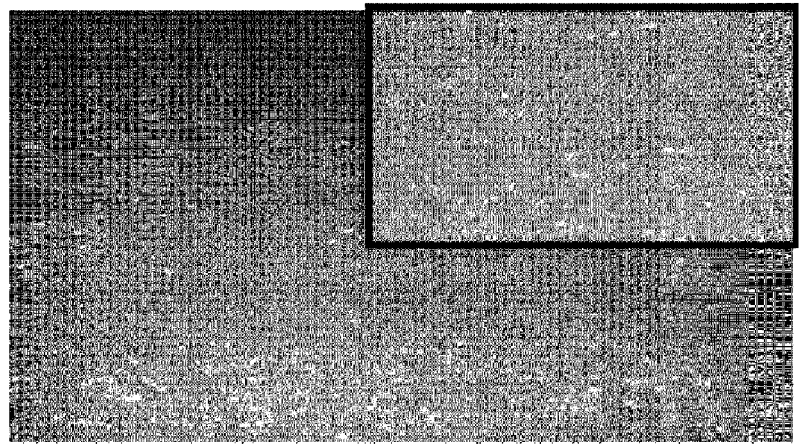
SAMPLE B
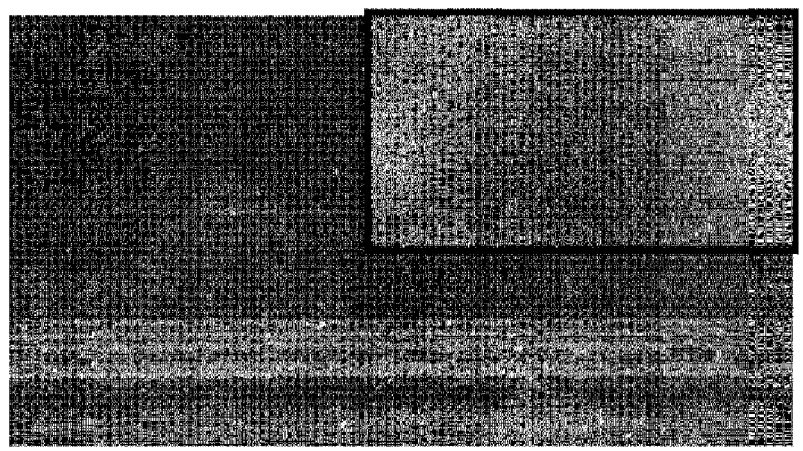
SAMPLE C
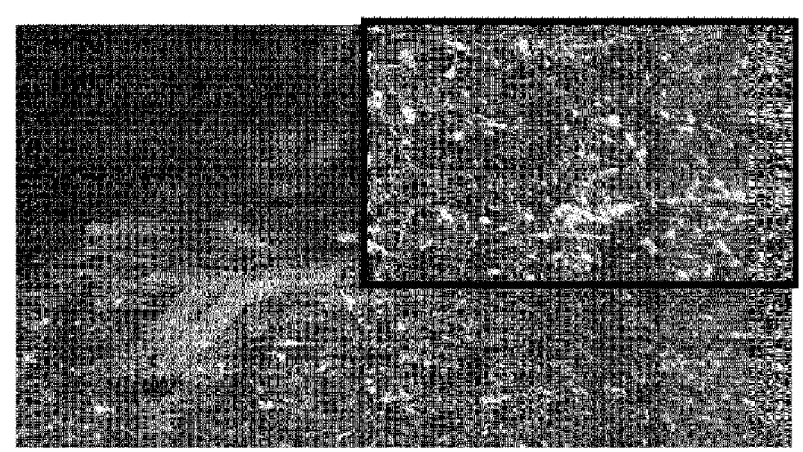
FIG. 6

METHOD FOR EVALUATING SHOCK RESISTANCE OF RUBBER MEMBER

TECHNICAL FIELD

The present invention relates to a method of evaluating the shock resistance of a rubber member.

BACKGROUND ART

In the related art, mechanical strength indicators such as elongation at break Eb and tensile strength at break TSb are used as performance evaluation indicators for rubber members such as conveyor belts.

For example, when a conveyed article is loaded on a conveyor belt, the conveyed article may impact strongly against a cover rubber covering a core body, causing cut damage to the surface of the cover rubber. To reduce this cut damage, rubber with high mechanical strength (elongation at break Eb and tensile strength at break TSb) has been developed.

A known method of evaluating this type of rubber material includes a DIN abrasion test in which a test piece made of a rubber material is pressed against a cylindrical member with an abrasive cloth wound on the outer circumferential surface, the cylindrical member is rotated a predetermined number of times, and the wear amount of the test piece is measured.

Furthermore, as a known technique for evaluating the durability of a rubber material for a conveyor belt, a method has been proposed in which the durability of a rubber material is evaluated on the basis of how much the weight of a test piece made from a rubber material for a conveyor belt was reduced by abrasive blasting the test piece for a predetermined period of time (see Patent Document 1 below). As described in Patent Document 1, a large impact force is applied to the surface of the test piece when the granular matter collides with the surface of the test piece, and the surface of the test piece is abraded by the impact force being applied multiple times. In other words, the test piece can be subjected to wear similar to the wear actually experienced by a conveyor belt, making it possible to reproduce the durability of an actual conveyor belt.

CITATION LIST

Patent Literature

Patent Document 1: JP 2008-224510 A

SUMMARY OF INVENTION

Technical Problem

There is a demand for the development of rubber member products such as conveyor belts that may be subjected to impacts during use to have high wear resistance and high shock resistance performance. Shock resistance performance depends on mechanical strength, as described above, as well as the energy absorbing properties of the rubber (hysteresis loss due to viscosity). However, quantitative evaluation of these are rare, and there is room for improvement.

For example, the loss tangent tan $\delta$, which is an indicator of the viscoelastic characteristics of a rubber member, uses the value at room temperature and several tens of Hz from the perspective of simplifying measurement, but the viscosity of the rubber member depends on speed, and thus, the viscosity characteristics of a speed region (frequency region) according to the application should be evaluated.

In light of the foregoing, an object of the present invention is to quantitatively evaluate the shock resistance performance of a rubber member.

Solution to Problem

In order to achieve the object described above, a method of evaluating shock resistance of a rubber member according to an aspect of the present invention comprises the step of:

evaluating a shock resistance performance of the rubber member using an elongation at break Eb, a tensile strength at break TSb, and a loss tangent tan $\delta$ of the rubber member; wherein a measurement condition of the loss tangent tan $\delta$ used in the step of evaluating the shock resistance performance is determined on the basis of a speed of an impact applied under use conditions of the rubber member.

In the method of evaluating the shock resistance of a rubber member, the loss tangent tan $\delta$ is a ratio between a storage modulus and a loss modulus calculated from stress when vibrations of a predetermined frequency are applied to the rubber member; and the predetermined frequency of the measurement condition is determined by matching the speed of an impact applied under use conditions of the rubber member to a maximum speed of the vibrations.

In the method of evaluating the shock resistance of a rubber member, a frequency characteristic curve indicating a relationship between the loss tangent tan $\delta$ and a frequency of the vibrations and a temperature curve indicating a relationship between the loss tangent tan $\delta$ and a temperature of the rubber member are substitutable; and the loss tangent tan $\delta$ used in the step of evaluating the shock resistance performance is calculated by calculating the temperature corresponding to the predetermined frequency on the basis of the relationship between the frequency characteristic curve and the temperature curve and using stress when vibrations are applied to the rubber member at the temperature.

In the method of evaluating the shock resistance of a rubber member, the rubber member is a cover rubber that covers a belt core body of a conveyor belt and has the predetermined frequency of 10 kHz.

In the method of evaluating the shock resistance of a rubber member, when the shock resistance performance calculated using the loss tangent tan $\delta$ at the predetermined frequency of 10 kHz is 6000 or greater, the shock resistance performance is determined to be high.

In the method of evaluating the shock resistance of a rubber member, a higher value for the shock resistance performance index of the rubber member, which is a product of the elongation at break Eb, the tensile strength at break TSb, and the loss tangent tan $\delta$ of the rubber member, indicates high shock resistance performance of the rubber member.

Advantageous Effects of Invention

According to the first aspect of the present invention, when the shock resistance performance of the rubber member is evaluated using the elongation at break Eb, the tensile strength at break TSb, and the loss tangent tan $\delta$ of the rubber member, the measurement condition of the loss tangent tan $\delta$ used in the evaluation of the shock resistance performance is determined on the basis of the speed of the impact applied under the use conditions of the rubber member. As a result, the shock resistance performance can be evaluated using the value of the loss tangent tan δ corresponding to an impact actually applied to the rubber member, and it is possible to improve the accuracy of the shock resistance performance evaluation.

Further, the measurement frequency (a predetermined frequency) of the loss tangent tan δ is determined by matching the speed of the impact applied under the use conditions of the rubber member to the maximum velocity of the vibrations, and thus, the shock resistance performance can be evaluated by reflecting the viscosity of the rubber member that changes depending on the speed of the impact.

Even in a case where the measurement of the loss tangent tan δ is performed at different temperatures rather than different frequencies, the value of the loss tangent tan δ corresponding to an impact actually applied when the rubber member is in use can be calculated.

The shock resistance performance of the cover rubber of the conveyor belt can be evaluated easily and accurately.

It is possible to provide a conveyor belt having sufficient shock resistance performance in its intended use environment.

The elongation at break Eb, the tensile strength at break TSb, and the loss tangent tan δ can be unified and compared in a simple manner, and it is possible to provide an evaluation index that clearly reflects the shock resistance performance of the rubber member.

BRIEF DESCRIPTION OF DRAWINGS

FIG. 5 is a table listing performance evaluation values and performance evaluation test results of samples A to C.

FIGS. 6A to 6C are surface photographs of conveyor belt cover rubber after use for a predetermined period of time.

DESCRIPTION OF EMBODIMENTS

A method of evaluating the shock resistance of a rubber member according to preferred embodiments of the present invention is described in detail below with reference to the accompanying drawings.

Figure 1:
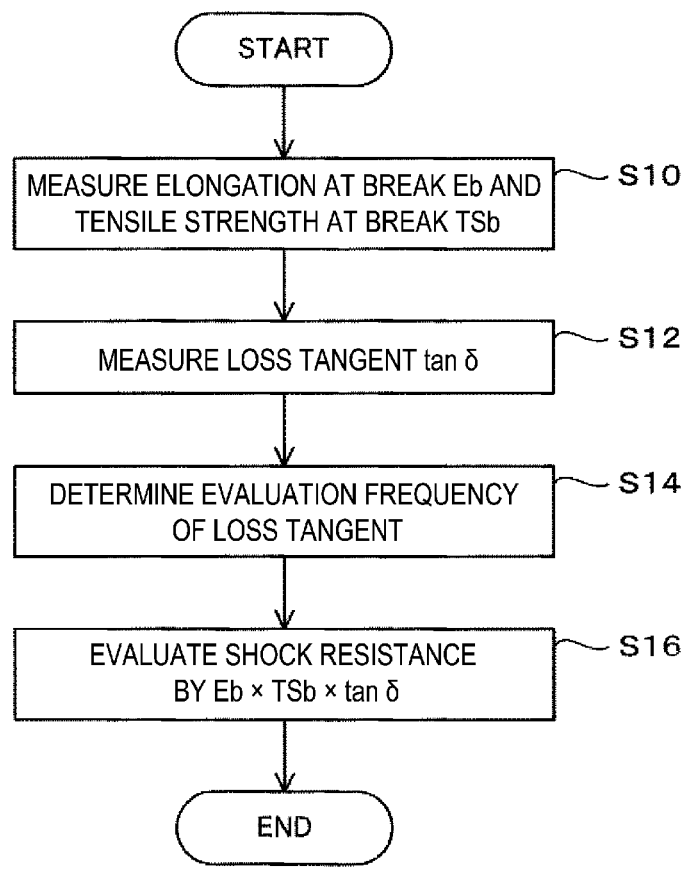
FIG. 1 is a flowchart illustrating the process of a method of evaluating the shock resistance according to an embodiment.

FIG. 1 is a flowchart illustrating the process of a method of evaluating the shock resistance according to an embodiment.

In the present embodiment, an elongation at break Eb, a tensile strength at break TSb, and a loss tangent tan δ of the rubber member are used to evaluate the shock resistance performance of the rubber member. Additionally, in the present embodiment, the rubber member to be evaluated is a cover rubber that covers a core body of a conveyor belt.

In FIG. 1, each step is put in order for convenience, but the order in which the parameters are measured, for example, may be interchangeable.

First, the elongation at break Eb and the tensile strength at break TSb of the rubber member are measured (step S10).

The elongation at break Eb and the tensile strength at break TSb are measured via a method involving pulling a test piece of the rubber member to be subjected to performance evaluation. The elongation at break Eb is the elongation when the test piece fails by being pulled, and is indicated as the ratio (%) relative to an initial distance between reference lines. The tensile strength at break TSb is the tensile force recorded when the test piece fails by being pulled divided by an initial cross-sectional area of the test piece.

The detailed process of measuring the elongation at break Eb and the tensile strength at break TSb is determined by the process specified in JIS K6251: vulcanized rubber and thermoplastic rubber—tensile properties.

Next, the loss tangent tan δ of the rubber member is measured (step S12).

The loss tangent tan δ is the ratio between the storage modulus and the loss modulus calculated from the stress when vibrations of a predetermined frequency is applied to the rubber member, that is, a ratio of the loss modulus to the storage modulus in the dynamic viscoelasticity measurement. Higher values mean higher viscosity and the higher the performance of converting kinetic energy to heat. In addition, when the viscosity is high, the apparent hardness of the impact point increases, which has the effect of dispersing stress in the surroundings and reducing the amount by which the object falls into the rubber member.

Thus, a high loss tangent tan δ of the rubber member indicates high shock resistance performance.

The measurement of the loss tangent tan δ of the rubber member is generally performed with a dynamic viscoelasticity measurement device.

With a dynamic viscoelasticity measurement device, a sample of the rubber member is clamped in the measurement head, and stress is applied to the sample from the load-generating portion via a probe. This stress is applied as a sinusoidal force at a frequency set as one of the measurement conditions in a manner so that the strain amplitude of the sample is constant. The amount of deformation (distortion) of the sample produced by this sinusoidal force is detected by a displacement detection unit, and various types of viscoelastic quantities such as loss tangent tan δ are calculated from the stress applied to the sample and the detected distortion and output.

Figure 4:
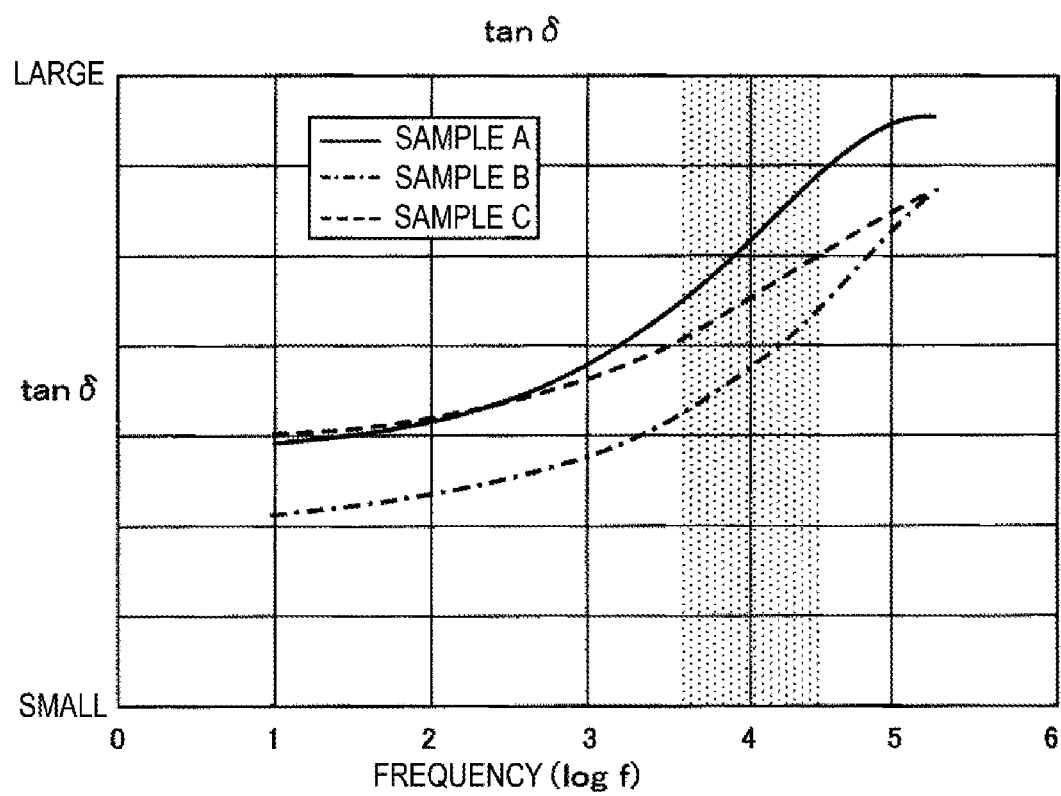
FIG. 4 is a graph showing a master curve of a loss tangent tan δ.

When the temperature is constant, as illustrated in FIG. 4, a master curve is obtained with frequency on the x-axis and tan δ (alternately, storage modulus or loss modulus are also possible) on the y-axis.

FIG. 4 shows the loss tangent tan δ of three types of rubber members (samples A to C).

Sample A is a shock resistance rubber example developed in-house. Sample B is a rubber-type H compliant product (JIS-H compliant) as specified in JIS K6369. Sample C is a rubber-type S compliant product (JIS-S compliant) as specified in JIS K6369.

The loss tangent tan δ of each rubber member increases from a low frequency band to a high frequency band as a whole, but the frequency characteristics differ from each other.

Note that the cover rubber thickness of the conveyor belt is typically from 5 mm to 25 mm. In this embodiment, a sample with a thickness of 10 mm was used. In addition, the temperature condition was set to 20° C.

Additionally, in practice, in a case in which a master curve having a frequency axis as illustrated in FIG. 4 is obtained, the measurement is performed by changing the temperature of the sample rather than changing the frequency of the vibrations. This is because the frequency characteristic curve indicating the relationship between the loss tangent tan δ and the frequency of the vibrations and a temperature characteristic curve indicating the relationship between the loss tangent tan δ and the environmental temperature at which measurement is performed can be converted to each other.

A known method of converting the frequency characteristic curve and the temperature characteristic curve can be used, and thus, the description thereof is omitted. However, a loss tangent tan δ at low temperatures corresponds to a loss tangent tan δ in a high frequency band, and a loss tangent tan δ at high temperatures corresponds to a loss tangent tan δ in a low frequency band.

Next, the frequency (evaluation frequency) of the loss tangent tan δ used in the evaluation of shock resistance performance is determined (step S14).

As described above, in step S12, a loss tangent tan δ is obtained as a frequency characteristic curve obtained by taking the frequency on the x-axis. In step S14, the loss tangent tan δ used in the evaluation of shock resistance performance is determined from the master curve.

Specifically, the evaluation frequency, which is the frequency of the loss tangent tan δ used to evaluate the shock resistance performance, is determined by matching the speed of the impact applied under the use conditions of the rubber member with the maximum speed of the vibrations.

A method of determining the evaluation frequency on the basis of the speed of the impact will be described using FIGS. 2 and 3.

For example, when the rubber member to be evaluated is a cover rubber that covers the core body of the conveyor belt, the impact applied under the use conditions of the rubber member is an impact when the conveyed article is loaded. In general, conveyed articles of a conveyor belt are dropped from a position higher than the conveyor belt surface (cover rubber surface) via a chute or the like, and loaded on the conveyor belt.

A drop speed Vf when the conveyed article lands on the conveyor belt is determined by a drop height H of the conveyed article. In other words, $V=\sqrt{2gH}$ (g: gravitational acceleration) is true.

Figure 2:
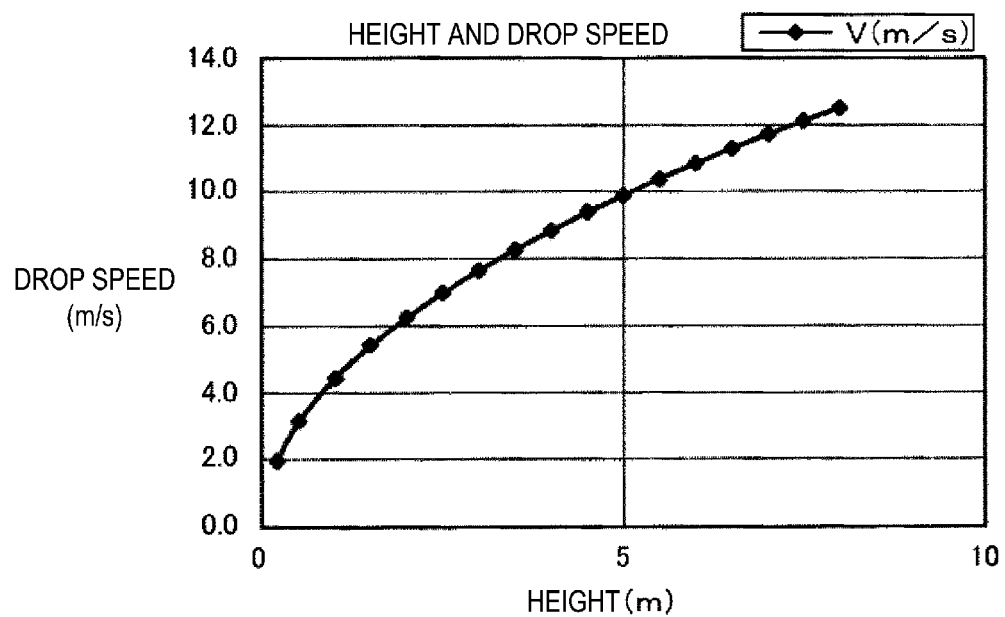
FIG. 2 is an explanatory diagram of a method of determining an evaluation frequency on the basis of a speed of an impact.

FIG. 2 is a graph showing the relationship between the drop height H of the conveyed article and the drop speed Vf when the conveyor belt is reached. For example, in a case in which the conveyed article on the conveyor belt is ore or the like, the drop height H is high and is approximately 8 m. In this case, the drop speed Vf when the conveyed article reaches the conveyor belt is approximately 12.5 m/s.

In the case of the drop height H being relatively low at approximately 0.5 m, for example, the drop speed Vf when the conveyed article reaches the conveyor belt is approximately 3.1 m/s.

Next, the maximum speed of vibrations in the dynamic viscoelasticity measurement is considered to find the relationship between the drop rate Vf and the measurement conditions of the loss tangent tan δ.

Figure 3:
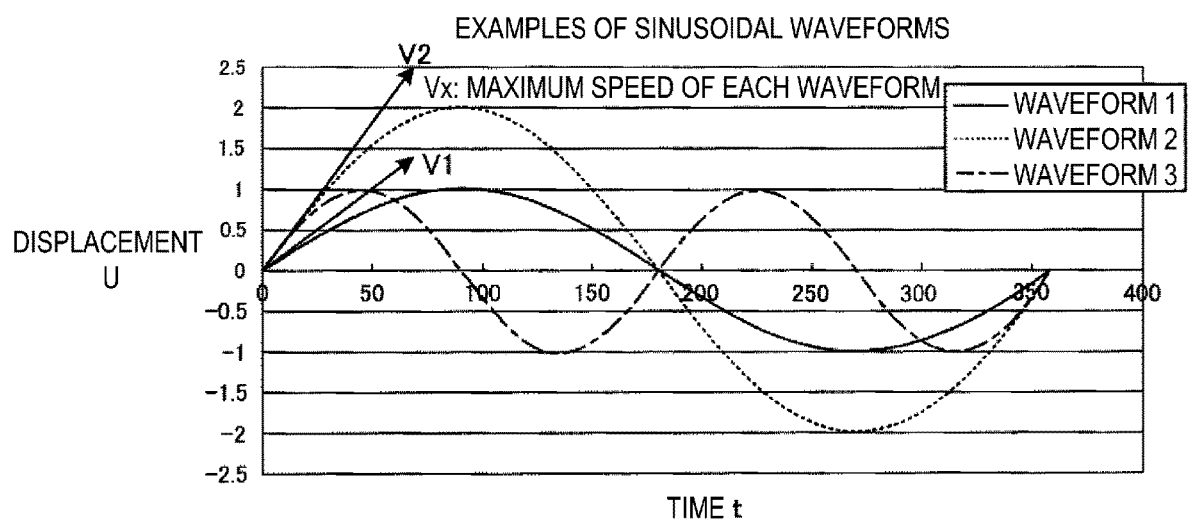
FIG. 3 is an explanatory diagram of a method of determining an evaluation frequency on the basis of a speed of an impact.

As shown in FIG. 3, with a sine wave with an amplitude A and a frequency f (angular frequency $\omega=2\pi f$), a displacement $U=A\sin(\omega t)$ and a speed $V=A\omega\cos(\omega t)$.

A maximum speed Vx is obtained at cos 0°=1 and $Vx=A\omega=2\pi f$.

When the drop speed Vf discussed above is substituted in for the maximum speed Vx, $f=Vf/2\pi A$.

When the amplitude A of the sine wave is 0.1 mm and the drop speed Vf described above equaling 3.1 m/s (dropped from a height of 0.5 m) to 12.5 m/s (dropped from a height of 8 m) is substituted in, the frequency f of the sine wave corresponds to from 4.9 kHz (dropped from a height of 0.5 m) to 19.9 kHz (dropped from a height of 8 m). This region corresponds to the shaded portion (Log f=approximately 3.7 to 4.3) of the graph of tan δ of FIG. 4. In this region, the tan δ of sample A is the highest, then sample C, then sample B.

To prevent damage to the cover rubber when articles are dropped (conveyed article) onto the cover rubber, the mechanical strength should be high at the point when the dropped article falls deepest into the cover rubber. Here, since the dropped article has a speed of 0 in a drop direction, it is reasonable to use the elongation at break Eb and the tensile strength at break TSb measured in the laboratory as is as indicators of mechanical strength.

However, since the energy absorbing properties in the initial impact period are influenced by the initial speed at which the dropped article comes into contact with the cover rubber, it is reasonable to set the tan δ representing the viscosity of the rubber member in consideration of the speed of the impact applied under the use conditions of the rubber member.

For example, when the cover rubber used in an environment in which the conveyed article is dropped from a height of 0.5 m, the evaluation frequency is 4.9 kHz, and when the cover rubber used in an environment in which the conveyed article is dropped from a height of 8 m, the evaluation frequency is 19.9 kHz.

In the rubber member manufacturing stage, it is not possible to know in detail the environment in which the rubber member will actually be used, making it difficult to specify the evaluation frequency. Thus, when the rubber member to be evaluated is a cover rubber that covers a core body of a conveyor belt as described above, 10 kHz may be used as a representative value of the evaluation frequency.

This is because for a cover rubber with an evaluation frequency less than 10 kHz, that is a cover rubber with a low impact speed in the use environment, there is a low demand for shock resistance performance and the need for evaluation using a shock resistance performance evaluation index is also low. As illustrated in FIG. 4, the value of the loss tangent tan δ increases as the frequency increases. However, by using 10 kHz as a representative value of the evaluation frequency of the cover rubber requiring shock resistance, shock resistance performance can be easily and accurately evaluated.

Note that in the flowchart of FIG. 1, the evaluation frequency was determined after the master curve measurement of the loss tangent tan δ, but no such limitation is intended. The loss tangent tan δ of the frequency may be measured in a pin point manner after the evaluation frequency is set.

Additionally, as described above, when the temperature characteristic curve is converted to a frequency characteristic curve, a temperature corresponding to the evaluation frequency may be calculated on the basis of the relationship between the curves, and the loss tangent tan δ may be calculated by measuring the stress when vibrations are applied to the rubber member at that temperature in a pin point manner.

Lastly, the elongation at break Eb, the tensile strength at break TSb, and the loss tangent tan δ are used to evaluate the shock resistance performance of the rubber member (step S16).

In the present embodiment, a higher value for the shock resistance performance index, i.e., the product of the elongation at break Eb, the tensile strength at break TSb, and the loss tangent tan δ of the rubber member indicates high shock resistance performance of the rubber member.

FIG. 5 is a table listing performance evaluation values and performance evaluation test results of the samples A to C. Note that each value listed in FIG. 5 is an average value of values measured of a plurality of samples of the same type.

In FIG. 5, the evaluation frequency of the loss tangent tan δ is 10 kHz, and the value of the sample A, which had the highest loss tangent tan δ, is set to a relative value of 100.

For the samples A, B, and C, the tensile strength at break TSb was 22.3, 28.2, and 20.9 respectively, the elongation at break Eb was 572, 562, and 530 respectively, and the loss tangent tan δ relative value was 100, 73, and 87.

From these measurements, it can be seen that the relative values of the shock resistance performance evaluation index (Eb×TSb×tan δ) is 100, 90, 76 for the samples A, B, and C respectively, and thus, when listed in order of highest shock resistance performance, the samples are sample A, sample B, and sample C.

Additionally, as described above, the shock resistance performances of the samples are compared using the relative values of the shock resistance performance evaluation index (Eb×TSb×tan δ), and the absolute values of the shock resistance performance evaluation index may be used to determine whether the sample satisfies a predetermined shock resistance performance.

Specifically, for example, in the case of the rubber member to be evaluated being a cover rubber that covers a core body of a conveyor belt, when the shock resistance performance evaluation index (Eb×TSb×tan δ) calculated using the loss tangent tan δ with the evaluation frequency equaling 10 kHz is, for example, 6000 or greater, the shock resistance performance is evaluated as high (meeting the predetermined shock resistance performance).

Figure 7:
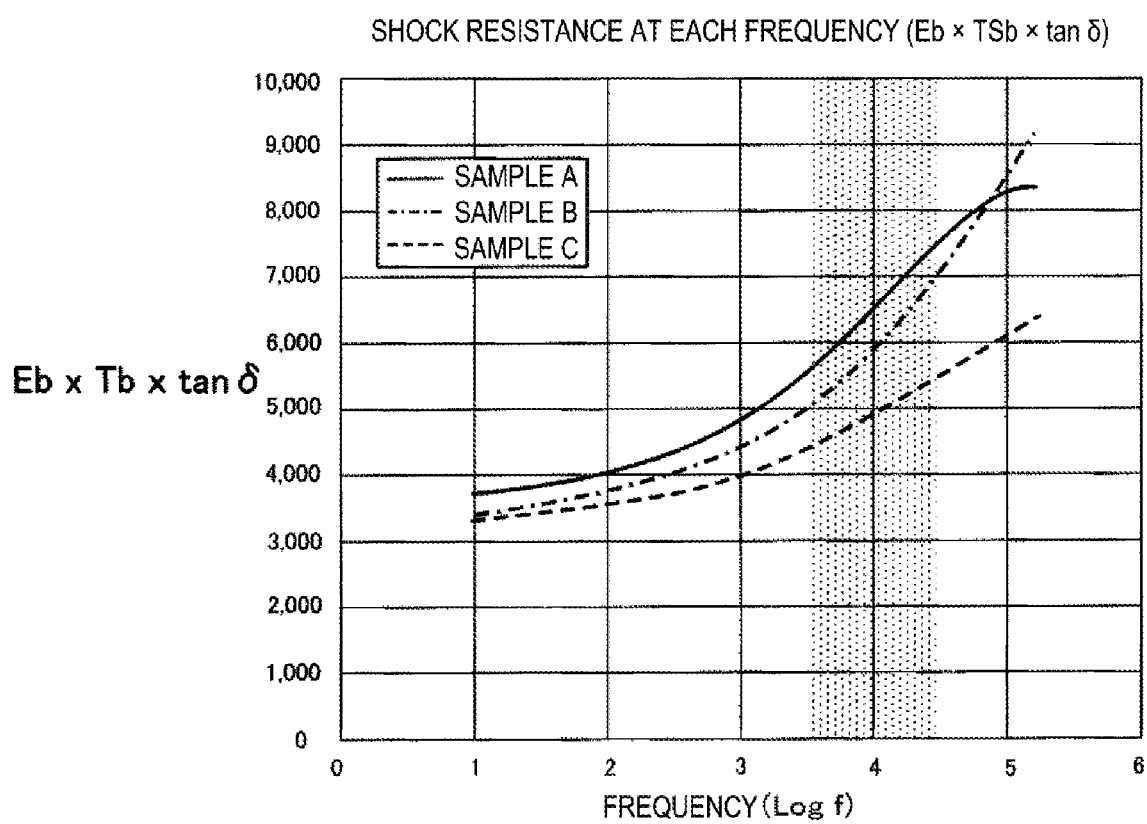
FIG. 7 is a graph showing the shock resistance performance evaluation index (Eb×TSb×tan δ) of the samples A to C.

FIG. 5 further lists the absolute values of a break energy index (Eb×TSb) and the shock resistance performance evaluation index (Eb×TSb×tan δ) of the samples A, B, and C. FIG. 7 is a graph showing the shock resistance performance evaluation index (Eb×TSb×tan δ) of the samples A to C. The tan δ at each frequency (see FIG. 4) was multiplied with the break energy index (Eb×TSb) to produce the graph of FIG. 7.

As illustrated in FIG. 5, for the samples A, B, and C, the break energy index (Eb×TSb) is 12761, 15848, and 11077 respectively, and the shock resistance performance evaluation index (Eb×TSb×tan δ) in which the loss tangent tan δ at 10 kHz was multiplied with the break energy index (Eb×Sb) is 6543, 5901, 4944 respectively.

Thus, only sample A is compliant with the criteria described above and has a shock resistance performance evaluation index (Eb×TSb×tan δ) of 6000 or greater.

The performance evaluation test was performed by a drop impact test, a DIN abrasion test, and surface observation of the conveyor belt cover rubber after use for a predetermined period of time.

The drop impact test was performed by dropping a needle from a predetermined height onto the surface of the sample and measuring how depth the needle entered. The results were found to be 17.2 mm and 19.9 mm for sample A and B respectively (the test was not performed on sample C), showing that sample A was more resistant to drop impact than sample B.

The DIN abrasion test was performed in accordance with the method specified in JIS K6264-2, with the result being 122, 117, and 167 for sample A, B, and C respectively. Accordingly, samples A and B had high and roughly equal DIN abrasion resistance, and the DIN abrasion resistance of sample C was lower than that of samples A and B.

FIGS. 6A to 6C are surface photographs of conveyor belt cover rubber made of the same materials of samples A to C after use for a predetermined period. Sample A had very little cut damage on the surface of the cover rubber. Sample B had more cut damage than sample A, but had relatively little cut damage. In contrast, sample C had a high amount of cut damage.

From these results, it can be seen that the shock resistance performance evaluation index (Eb×TSb×tan δ) using the elongation at break Eb, the tensile strength at break TSb, and the loss tangent tan δ reflects the shock resistance performance of the actual rubber member with high accuracy.

As described above, the method of evaluating the shock resistance of a rubber member according to an embodiment includes: evaluating the shock resistance performance of the rubber member using the elongation at break Eb, the tensile strength at break TSb, and the loss tangent tan δ of the rubber member, wherein the measurement condition of the loss tangent tan δ used in the evaluation of the shock resistance performance is determined on the basis of the speed of the impact applied under the use conditions of the rubber member. As a result, the shock resistance performance can be evaluated using the value of the loss tangent tan δ corresponding to an impact actually applied to the rubber member, and it is possible to improve the accuracy of the shock resistance performance evaluation.

In addition, since the shock resistance performance method of the rubber member according to an embodiment determines the measurement frequency (a predetermined frequency) of the loss tangent tan δ by matching the speed of the impact applied under the use conditions of the rubber member to the maximum velocity of the vibrations, the shock resistance performance can be evaluated by reflecting the viscosity of the rubber member that changes depending on the speed of the impact.

Additionally, in the method of evaluating the shock resistance of a rubber member according to an embodiment, even in a case where the measurement of the loss tangent tan δ is performed at different temperatures rather than different frequencies, the value of the loss tangent tan δ corresponding to an impact actually applied when the rubber member is in use can be calculated.

In addition, with the method of evaluating the shock resistance of a rubber member according to an embodiment, the elongation at break Eb, the tensile strength at break TSb, and the loss tangent tan δ can be unified and compared in a simple manner, and it is possible to provide an evaluation index that clearly reflects the shock resistance performance of the rubber member.

Additionally, with such an evaluation index, the development policy of shock resistance rubber members can be made clear. A high loss tangent tan δ in a low frequency band leads to an increase in traveling resistance. Thus, for example, a rubber member with an improved loss tangent tan δ in a high frequency band corresponding to the speed of impact and the loss tangent tan δ in a low frequency band being suppressed can be developed. Formulating development policies of rubber members with selectively high cut resistance in this manner is advantageous.

The invention claimed is:

1. A method of evaluating shock resistance of a rubber member, comprising the step of:
   evaluating a shock resistance performance of the rubber member using a shock resistance performance index which is a product of an elongation at break Eb, a tensile strength at break TSb, and a loss tangent tan δ of the rubber member;
   a measurement condition of the loss tangent tan δ used in the step of evaluating the shock resistance performance being determined on the basis of tan δ corresponding to a speed of an impact applied to the rubber member;
   wherein
   the loss tangent tan δ is a ratio between a storage modulus and a loss modulus calculated from stress when vibrations of a predetermined frequency are applied to the rubber member; and
   the predetermined frequency of the measurement condition is determined by matching the speed of an impact applied to the rubber member to a maximum speed of the vibrations; and
   a frequency characteristic curve indicating a relationship between the loss tangent tan δ and a frequency of the vibrations and a temperature characteristic curve indicating a relationship between the loss tangent tan δ and a temperature of the rubber member are substitutable; and
   the loss tangent tan δ used in the step of evaluating the shock resistance performance is calculated by calculating the temperature corresponding to the predetermined frequency on the basis of the relationship between the frequency characteristic curve and the temperature characteristic curve and using stress when vibrations are applied to the rubber member at the temperature.

2. The method of evaluating the shock resistance of a rubber member according to claim 1, wherein
   the rubber member is a cover rubber that covers a core body of a conveyor belt, and the predetermined frequency is 10 kHz.

3. The method of evaluating the shock resistance of a rubber member according to claim 2, wherein
   when the shock resistance performance calculated using the loss tangent tan δ at the predetermined frequency of 10 kHz is 6000 or greater, the shock resistance performance is determined to be high.

4. The method of evaluating the shock resistance of a rubber member according to claim 1, wherein
   a higher value for the shock resistance performance index of the rubber member, which is a product of the elongation at break Eb, the tensile strength at break TSb, and the loss tangent tan δ of the rubber member, indicates high shock resistance performance of the rubber member.

* * * * *